United States Patent
Lee et al.

(10) Patent No.: US 11,745,530 B2
(45) Date of Patent: Sep. 5, 2023

(54) DECORATIVE MATERIAL HAVING EXCELLENT PRINTING PROPERTIES AND METHOD OF MANUFACTURING THE SAME

(71) Applicant: LG HAUSYS, LTD., Seoul (KR)

(72) Inventors: Han Na Lee, Seoul (KR); Heon Jo Kim, Seoul (KR); Se Ra Yang, Seoul (KR)

(73) Assignee: LG Hausys, Ltd., Seoul (KR)

( * ) Notice: Subject to any disclaimer, the term of this patent is extended or adjusted under 35 U.S.C. 154(b) by 147 days.

(21) Appl. No.: 17/276,035

(22) PCT Filed: Jul. 15, 2019

(86) PCT No.: PCT/KR2019/008686
§ 371 (c)(1),
(2) Date: Mar. 12, 2021

(87) PCT Pub. No.: WO2020/054960
PCT Pub. Date: Mar. 19, 2020

(65) Prior Publication Data
US 2022/0055392 A1    Feb. 24, 2022

(30) Foreign Application Priority Data
Sep. 13, 2018 (KR) .......................... 10-2018-0109469

(51) Int. Cl.
*B44C 1/16* (2006.01)
*C09D 11/30* (2014.01)
(Continued)

(52) U.S. Cl.
CPC ............. *B41M 7/0045* (2013.01); *B44C 1/16* (2013.01); *C08F 222/102* (2020.02);
(Continued)

(58) Field of Classification Search
CPC ........ B41M 7/0045; B41M 1/04; B41M 1/06; B41M 1/10; B41M 1/12; B41M 5/52;
(Continued)

(56) References Cited

FOREIGN PATENT DOCUMENTS

| CN | 102516889 A | 6/2012 |
|----|-------------|--------|
| CN | 108348955 A | 7/2018 |

(Continued)

OTHER PUBLICATIONS

Machine English translation of TW201418057, Sasaki et al. (Year: 2014).*

(Continued)

*Primary Examiner* — Jessica M Roswell
(74) *Attorney, Agent, or Firm* — BRYAN CAVE LEIGHTON PAISNER LLP

(57) ABSTRACT

The present invention relates to a decorative material having excellent printability, and the decorative material according to the present invention has an ink-receiving layer having a radially fine sloping structure having a dendritic shape, whereby the absorbing and/or fixing property, i.e., printability, of the ink printed on the ink-receiving layer is improved, and clarity is excellent, so that aesthetic effects are excellent. In addition, since the ink-receiving layer is manufactured through UV curing, it can be directly coated on a substrate layer, and can include various kinds of substrate layers; and since it is manufactured using a solvent-free type resin composition without using an organic solvent, and has an excellent absorbing and/or fixing property with respect to a water soluble ink, it has environmental friendly advantages.

15 Claims, 6 Drawing Sheets

(51) Int. Cl.
  *B41M 7/00*   (2006.01)
  *C08J 7/04*   (2020.01)
  *C08F 222/10* (2006.01)
  *C08J 7/12*   (2006.01)

(52) U.S. Cl.
  CPC ............. *C08J 7/0427* (2020.01); *C08J 7/123* (2013.01); *C09D 11/30* (2013.01); *C08J 2327/06* (2013.01); *C08J 2435/02* (2013.01)

(58) Field of Classification Search
  CPC .... B41M 5/5254; B41M 1/30; B41M 5/0011; B41M 5/0047; B41M 5/0064; B44C 1/16; B44C 1/162; B44C 1/1704; C08F 222/102; C08F 222/1065; C08J 7/0427; C08J 7/123; C08J 2327/06; C08J 2435/02; C08J 2475/14; C08J 3/24; C08J 2367/02; C09D 11/30; C09D 11/10; C09D 4/00; C09D 11/101; C09D 11/037; C09D 11/107; B32B 27/08; B32B 27/20; B32B 27/304; B32B 27/32; B32B 2250/244; B32B 27/36; B32B 2255/10; B32B 2307/748; B32B 27/365; B32B 2255/02; B32B 2307/412; B32B 2307/538; B32B 2307/558; B32B 2307/584; B32B 27/306; B32B 27/308; B32B 2255/26; B32B 2307/75; B32B 2471/00; B32B 2607/02
  See application file for complete search history.

(56) References Cited

FOREIGN PATENT DOCUMENTS

| | | |
|---|---|---|
| CN | 108368364 A | 8/2018 |
| JP | 11170718 A | 6/1999 |
| JP | 11-179828 A | 7/1999 |
| JP | 2003-041488 A | 2/2003 |
| JP | 2008-068453 A | 3/2008 |
| JP | 2011-031511 A | 2/2011 |
| JP | 5467302 B1 | 4/2014 |
| JP | 2015-047857 A | 3/2015 |
| JP | 2016-088956 A | 5/2016 |
| JP | 2017-132123 A | 8/2017 |
| KR | 10-2004-0075443 A | 8/2004 |
| TW | 201418057 A * | 5/2016 ............. B41M 5/52 |

OTHER PUBLICATIONS

Office Action of The State Intellectual Property Office of People's Republic of China in Chinese Appl'n No. 201980060291.4, dated Sep. 3, 2021.

\* cited by examiner

[Figure 1]
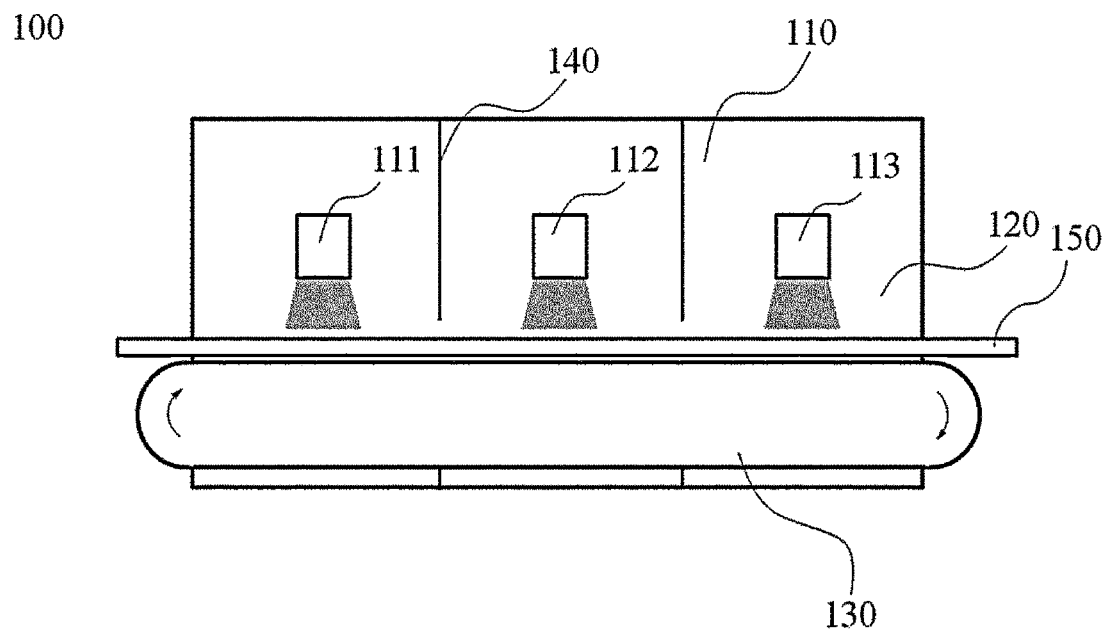

[Figure 2]
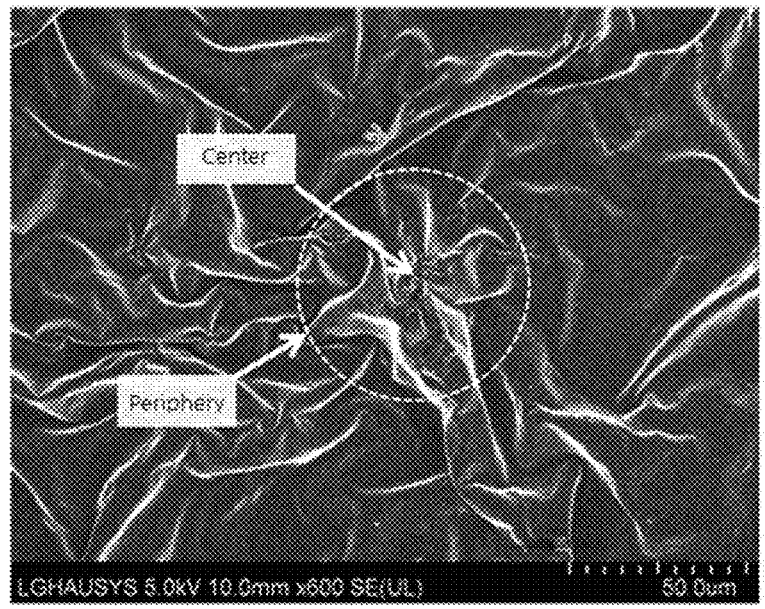
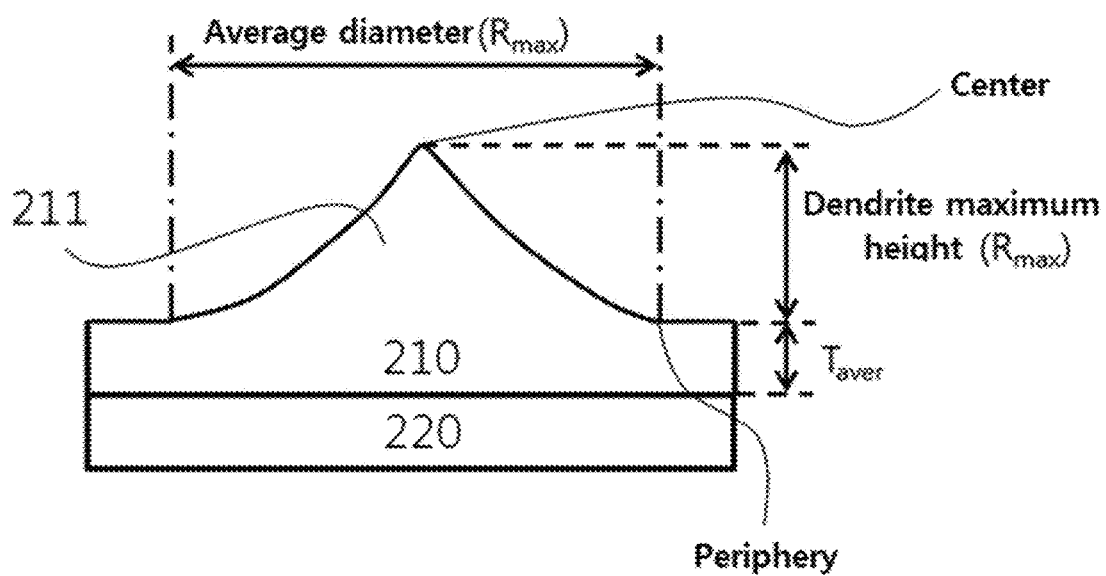

[Figure 3]
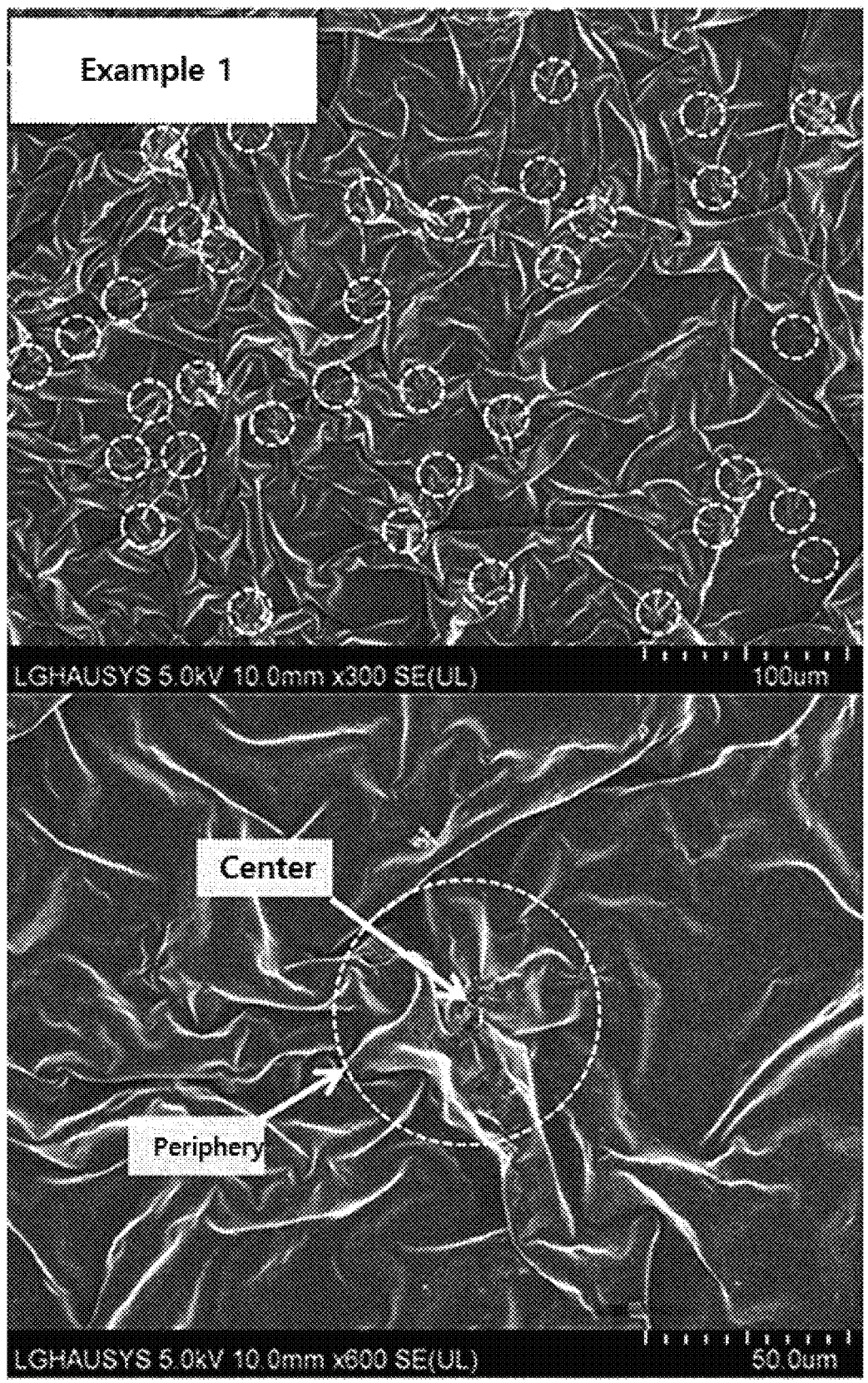

[Figure 4]
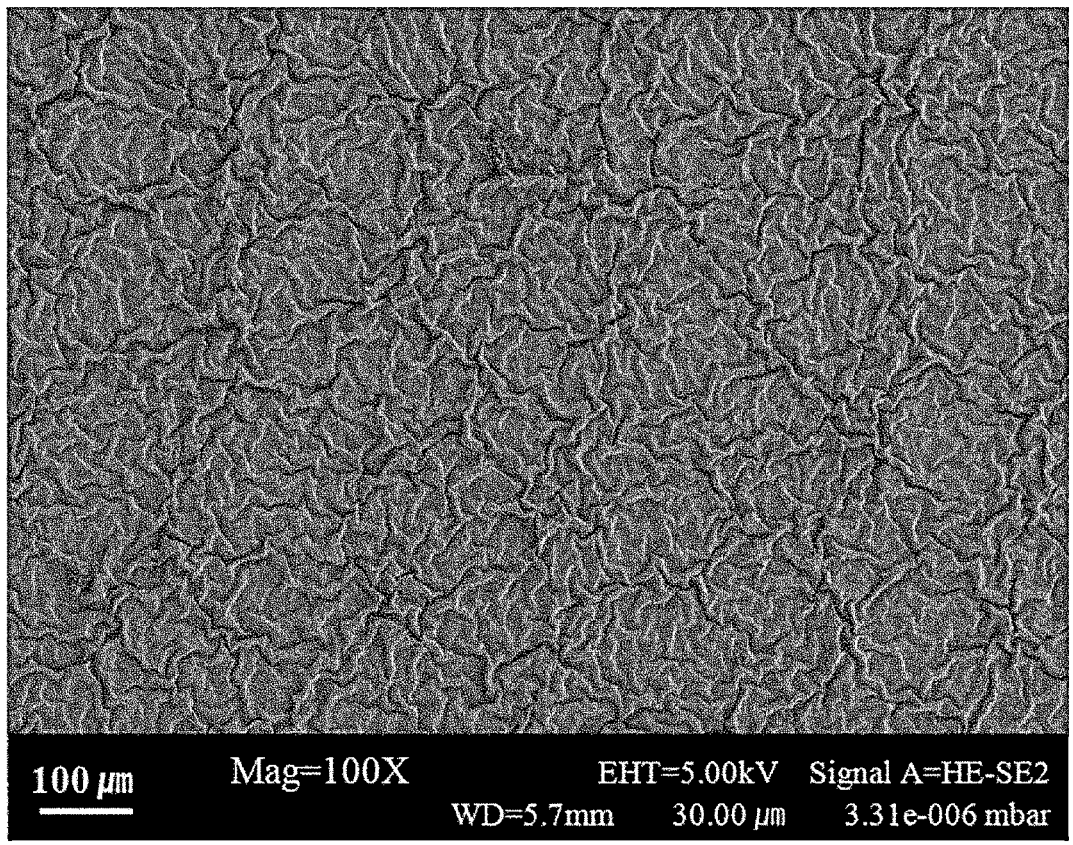

[Figure 5]
Comp. Ex. 1
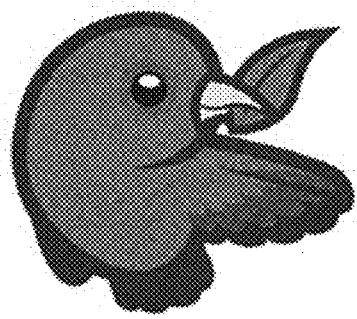
Comp. Ex. 2
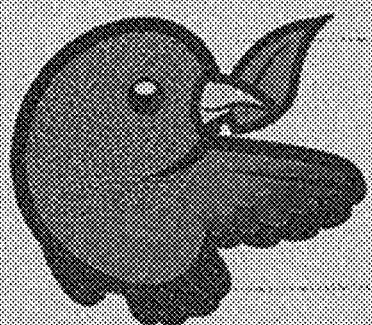
Comp. Ex. 3
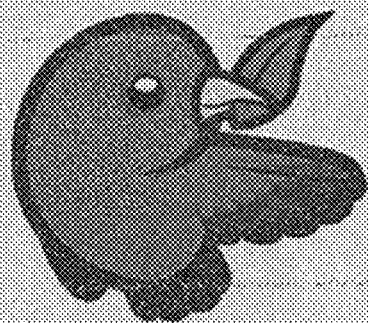
Ex. 1
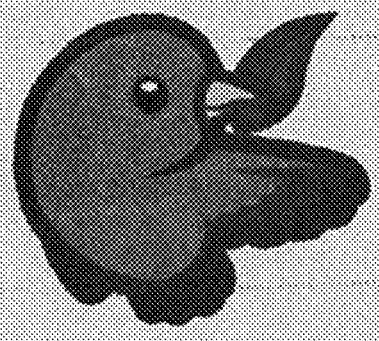

[Figure 6]
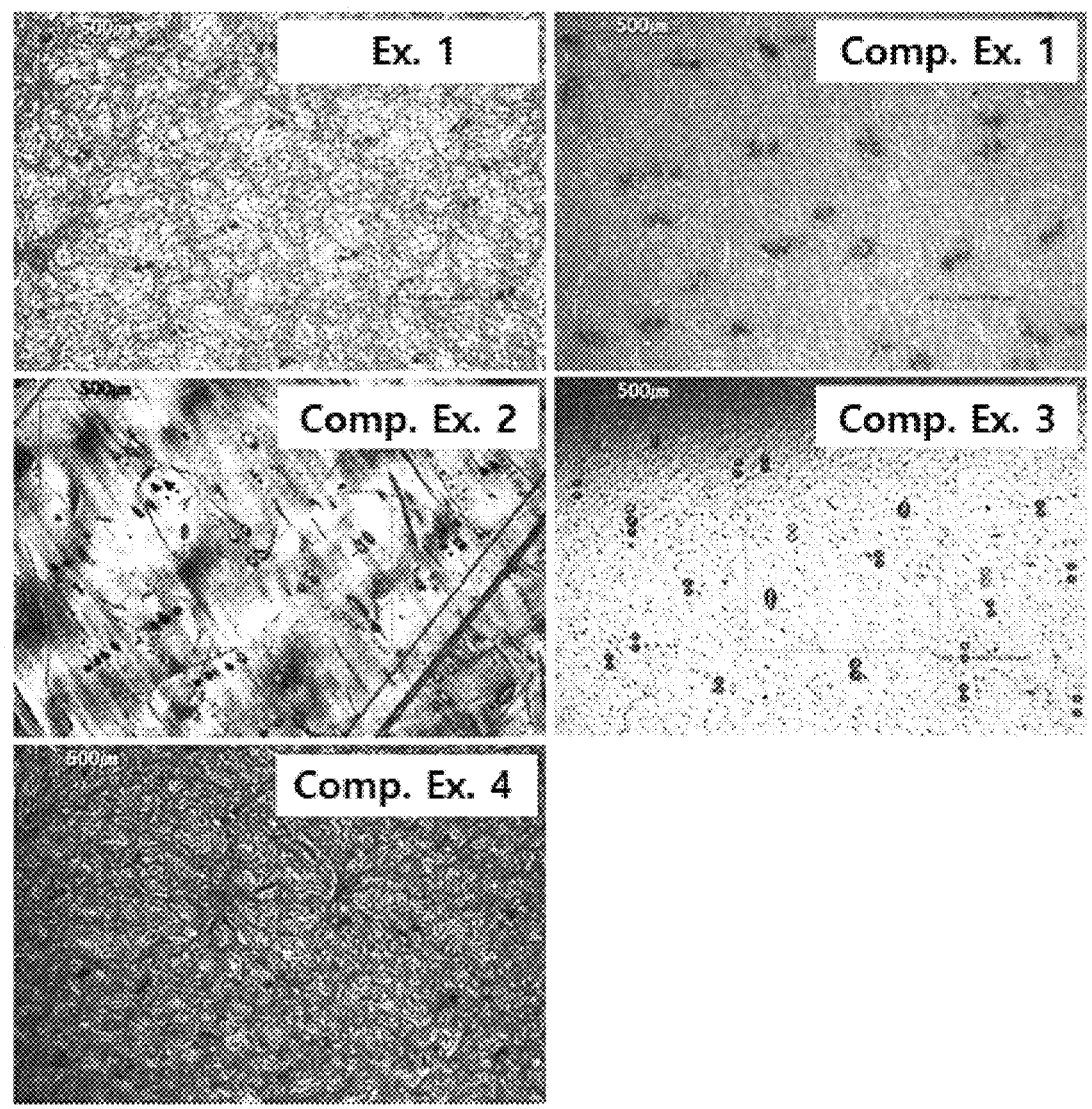

DECORATIVE MATERIAL HAVING EXCELLENT PRINTING PROPERTIES AND METHOD OF MANUFACTURING THE SAME

This application is a National Stage Entry of International Application No. PCT/KR2019/008686, filed on Jul. 15, 2019, and claims the benefit of and priority to Korean Application No. 10-2018-0109469, filed on Sep. 13, 2018, all of which are hereby incorporated by reference in their entirety for all purposes as if fully set forth herein.

TECHNICAL FIELD

The present invention relates to a decorative material having excellent printing properties and a method of manufacturing the same, and more particularly, to the decorative material having excellent print clarity and printability even in high-speed printing by providing an ink-receiving layer having hydrophilicity and a high surface area by including a specific surface structure, and the method of manufacturing the same.

BACKGROUND ART

In recent years, the interest in interiors has increased and demand for decorative materials having excellent designability has increased. Conventionally, a method of forming a printed layer so that a desired design is formed on a substrate layer of a wall paper or a floor material has been used in order to impart a design to a decorative material such as wall paper and floor materials. At this time, in order to manufacture a decorative material having high designability, it is important that the printed layer be formed accurately and clearly on the substrate layer.

Paper is widely used as a substrate layer for forming a printed layer, and in general, there is no great difficulty in forming the printed layer on the substrate layer when paper is used as a substrate layer. However, depending on the type of substrate layer, the ink forming the printed layer may not adhere well onto the substrate layer, and thus the design represented by the printed layer is not accurately expressed, and the appearance quality of the entire decorative material may be greatly impaired. To solve this problem, Korean Patent Application Publication No. 2017-0075912 discloses a technique of introducing an ink-receiving layer capable of receiving ink of a printed layer between a substrate and the printed layer before forming the printed layer on the substrate layer.

However, since the above technique has a method of forming an ink-receiving layer through thermal drying or thermal curing at a temperature condition of 80° C. or higher, when a thermally weak substrate layer such as polyvinylchloride (PVC) is used, curling of the substrate layer may occur, and in order to prevent this, it is necessary to apply a method to transfer an already prepared ink-receiving layer without directly forming the ink-receiving layer on the substrate layer, such that there are process limitations.

Therefore, there is a demand for the development of a decorative material having excellent clarity and capable of directly forming an ink-receiving layer regardless of the type of substrate layer and having an absorbing and/or fixing property, i.e., printability, of the ink.

DISCLOSURE

Technical Problem

An object of the present invention is to provide a decorative material capable of directly forming an ink-receiving layer regardless of the kind of substrate layer and having excellent printability and clarity, and a method of manufacturing the same.

Technical Solution

Accordingly, the present invention provides, in one embodiment, a decorative material comprising a substrate layer, an ink-receiving layer, and a printed layer;

wherein the ink-receiving layer comprises an ink-receiving layer of an acrylic resin composition having a dendritic shape, which is a radially sloping structure extending from a center to a periphery with a point on the surface as the center; and an average size of ink droplets present in a unit area of 0.1 $cm^2$ when observing the surface with an optical microscope is 50 μm or less.

The present invention also provides, in one embodiment, a method of manufacturing a decorative material, comprising the steps of:

irradiating an acrylic resin composition applied on a substrate layer with ultraviolet rays to form an ink-receiving layer having a dendritic shape in which one point on a surface is set as a center and which has a radially sloping structure extending from the center to a periphery; and forming a printed layer with ink on the formed ink-receiving layer, wherein the step of forming the printed layer is carried out at a printing speed of 50 to 150 m/min.

Advantageous Effects

The decorative material according to the present invention has an ink-receiving layer having a radially fine sloping structure having a dendritic shape, so that the absorbing and/or fixing property, i.e., printability, of the ink printed on the ink-receiving layer are improved, and hence the decorative material has an excellent aesthetic effect because of excellent clarity.

In addition, since the ink-receiving layer is manufactured through UV curing, it can be directly coated on a substrate layer, and can include various kinds of substrate layers; and since it is manufactured using a solvent-free type resin composition without using an organic solvent, and has an excellent i absorbing and/or fixing property with respect to a water soluble ink, and it has environmental friendly advantages.

DESCRIPTION OF DRAWINGS

FIG. 1 is a structural diagram showing an example of a photocuring apparatus used in manufacturing an ink-receiving layer according to the present invention.

FIGS. 2 and 3 are scanning electron microscope (SEM) images of the surface of the ink-receiving layer of Example 1 according to the present invention.

FIG. 4 is a scanning electron microscope (SEM) image of the surface of the ink-receiving layer of Comparative Example 4 according to the present invention.

FIG. 5 is a photographic image of the surface of the decorative material of Example 1 and Comparative Examples 1 to 3.

FIG. 6 is an image obtained by photographing the decorative material surfaces of Example 1 and Comparative Examples 1 to 4 with an optical microscope at 5× magnification.

MODES OF THE INVENTION

In the present invention, various modifications may be made and various embodiments may be provided, and specific embodiments will be illustrated in the drawings and described in detail in the detailed description.

It should be understood, however, that this is not intended to limit the present invention to particular embodiments, but is to cover all modifications, equivalents, or alternatives falling within the spirit and scope of the invention.

It should be understood that in the present invention, the term "comprises" or "has" is intended to specify the presence of stated features, numbers, steps, operations, elements, components, or combinations thereof, but does not preclude the presence or addition of one or more other features, numbers, steps, operations, elements, components, or combinations thereof.

It is also to be understood that the appended drawings are drawn to scale for ease of description.

Hereinafter, the present invention will be described in detail with reference to the drawings, and the same or corresponding components are given the same reference numerals regardless of drawing numbers, and duplicate descriptions thereof will be omitted.

In the present invention, "surface roughness" indicates the degree of fine irregularities present on the surface, and may be expressed as "Rz". Here, "Rz" represents a deviation by taking a reference length L as a cross-sectional curve of the surface and measuring an interval between peaks from the high side to the fifth peak of the sloping structure and the valleys from the deeper side to a fifth valley in a straight line that does not cross the cross sectional curve parallel to the average line of the portion, and is also referred to as "ten point average roughness".

In the present invention, the unit "T" is a unit indicating the thickness of the layer constituting a film, sheet or laminated film, and may be the same as the unit "mm".

The present invention relates to a decorative material and a method of manufacturing the same.

In recent years, the interest in interiors has increased and demand for decorative materials having excellent designability has increased. Conventionally, a method of forming a printed layer so that a desired design is formed on a substrate layer of wall paper or a floor material has been used in order to impart a design to a decorative material such as wall paper and a floor material. At this time, in order to manufacture a decorative material having high designability, it is important that the printed layer be formed accurately and clearly on the substrate layer.

However, depending on the type of substrate layer, the ink forming the printed layer may not adhere well onto the substrate layer, and thus the design represented by the printed layer is not accurately expressed, and the appearance quality of the entire decorative material may be greatly impaired. In addition, in order to solve such a problem, the conventional techniques of introducing an ink-receiving layer between a substrate layer and a printed layer mostly form the ink-receiving layer through thermal drying or thermal curing under a temperature condition of 80° C. or more, and therefore when using a thermally weak substrate layer such as polyvinyl chloride (PVC), curling of the substrate layer occurs, and to prevent this, it is necessary to apply a method to transfer an already prepared ink-receiving layer without directly forming the ink-receiving layer on the substrate layer, such that there are process limitations.

Accordingly, the present invention provides a decorative material having excellent printing properties and a method of manufacturing the same.

Since the decorative material according to the present invention has an ink-receiving layer having a radially fine sloping structure having a dendrite shape, thereby improving the water absorbing and/or fixing property, i.e., printability, of the ink printed on the ink-receiving layer and having excellent clarity, it has an excellent aesthetic effect, and since it is manufactured using a solvent-free resin composition and a water soluble ink, it has environmental friendly advantages.

Hereinafter, the present invention will be described in more detail.

Decorative Material

The present invention, in one embodiment, provides a decorative material comprising:
a substrate layer; and
an ink-receiving layer having a dendritic shape, which is a radially sloping structure extending from a center to a periphery with a point on the surface as the center.

The decorative material according to the present invention comprises an ink-receiving layer of a composition comprising an acrylic oligomer on a substrate layer, wherein the ink-receiving layer has a sloping structure having a specific shape on a surface thereof. Specifically, the decorative material includes an ink-receiving layer having a fine sloping structure on a surface thereof on an outermost surface, and the sloping structure has a structure in which radial irregularities extending from the center to the periphery and decreasing in height in a direction from the center to the periphery are randomly dispersed, with an arbitrary point existing on the surface of the ink-receiving layer as a center. For example, the radially sloping structure may include a structure in which an arborescence structure or a dendrite structure centered at any point on the surface of the ink-receiving layer is randomly distributed.

Furthermore, a surface property, in particular, printability of the radially sloping structure can be adjusted by its size or height, and for this purpose, the radial fine sloping structure may be controlled to have an average diameter in a specific range. Specifically, the average diameter of the radially sloping structure represents the average size of the individual radially sloping structure present on the surface of the ink-receiving layer, and the average diameter may be 5 μm to 500 μm, and more specifically, 5 μm to 450 μm, 5 μm to 400 μm, 5 μm to 350 μm, 5 μm to 300 μm, 5 μm to 250 μm, 5 μm to 200 μm, 5 μm to 150 μm, 5 μm to 100 μm, 5 μm to 50 μm, 50 μm to 200 μm, 50 μm to 100 μm, 100 μm to 500 μm, 100 μm to 300 μm, 100 μm to 200 μm, 80 μm to 150 μm, 20 μm to 100 μm, 25 μm to 60 μm, 40 μm to 80 μm, 80 μm to 120 μm, 90 μm to 110 μm, 5 μm to 40 μm, 5 μm to 30 μm, 5 μm to 25 μm, 5 μm to 20 μm, 5 μm to 15 μm, 5 μm to 10 μm, 10 μm to 30 μm, 15 μm to 30 μm, 15 μm to 25 μm, 20 μm to 30 μm, 1 μm to 10 μm, 2 μm to 10 μm, 4 μm to 10 μm, 5 μm to 10 μm, 7.5 μm to 10 μm, 8 μm to 10 μm, 0.5 μm to 7.5 μm, 0.5 μm to 5 μm, 0.5 μm to 3 μm, 0.5 μm to 2 μm, 0.5 μm to 1 μm, 1 μm to 5 μm, 1 μm to 3 μm, 1 μm to 2 μm, 2 μm to 5 μm, 2 μm to 3.5 μm, 4 μm to 8 μm, 4 μm to 6 μm, 5 μm to 8 μm, 5 μm to 6.5 μm, 6 μm to 9 μm, 6 μm to 8 μm, 7 μm to 9 μm or 3 μm to 5 μm.

In addition, the ink-receiving layer may have a radially sloping structure formed on a surface thereof to have a constant surface roughness. Specifically, the average value of the surface roughness "Rz" of the radially sloping structure present on the surface of the ink-receiving layer may be 0.5 μm to 10 μm, and more specifically, the upper limit may be 10 μm or less, 8 μm or less, 6 μm or less, 5 μm or less, 4 μm or less, 3 μm or less, 2 μm or less, and the lower limit may be 0.5 μm or more, 1 μm or more, 2 μm or more, 4 μm or more, 5 μm or more or 6 μm or more. For example, the surface roughness (Rz) of the radially sloping structure may be 0.5 μm to 6 μm, 1 μm to 3 μm, 1 μm to 5, 1 μm to 7 μm, 1 μm to 9 μm, 2 μm to 10 μm, 4 μm to 10 μm, 6 μm to 10 μm, 8 μm to 10 μm, 2 μm to 4 μm, 3 μm to 7 μm, 6 μm to 9 μm, 4 μm to 6 μm, 7 μm to 9 μm, 3 μm to 5 μm, 4 μm to 7 μm, 6 μm to 8 μm, 3 μm to 8 μm, 0.5 μm to 4 μm, 0.5 μm to 6 μm, 1 μm to 3.5 μm, 2 μm to 7 μm, 2.5 μm to 5 μm, 2.8 μm to 4.1 μm, or 3.5 μm to 4.1 μm.

In addition, the radially sloping structure may be formed at a certain frequency, e.g. a certain number, in a unit area, and the number of radially sloping structures may be the same as the number of centers of radially sloping structures present in a unit area. Further, there may be 20 to 400, specifically, 20 to 350, 20 to 300, 20 to 250, 20 to 200, 20 to 150, 100 to 400, 100 to 350, 150 to 350, 250 to 350, 200 to 400, 30 to 100, 25 to 180, 25 to 150, 25 to 120, 40 to 100, 30 to 80, 20 to 50, 30 to 50, 40 to 60, 80 to 120, 140 to 180, 30 to 40, 105 to 150, 100 to 120, 150 to 160, or 70 to 180 radially sloping structures per unit area (1 mm×1 mm) of the ink-receiving layer surface.

For example, the ink-receiving layer may have 80 to 120 dendrite shapes having an average diameter of 60 to 70 μm and a surface roughness Rz of 2 to 4.5 μm per unit area (1 mm×1 mm).

In the decorative material according to the present invention, by including the radially sloping structure having the above-described form and frequency on the surface of the ink-receiving layer as the outermost layer, the surface area of the inkjet receiving layer is increased, so that not only absorbency and/or adhesion with respect to ink, i.e., printability, is improved, but also adhesion to the substrate layer and the like may be optimized, whereby various physical properties such as aesthetic effects and durability of the decorative material may be improved.

As an example, the decorative material of the present invention can optimize the surface roughness of the ink-receiving layer to increase the surface area thereof, and can improve an ink fixing property thereof due to surface hydrophilization through UV curing, unlike the ink-receiving layer formed through thermal drying and/or thermal curing. Specifically, the ink printed on the ink-receiving layer may have an excellent fixing property as the size of the droplets is small and constant without spreading, and has a characteristic that the clarity of the printed pattern and/or pattern is high as the fixing property of the ink is high. The decorative material of the present invention may have an average size of ink droplets present in a unit area (0.1 cm$^2$) of 50 μm or less when the surface of the printed decorative material is viewed under an optical microscope, and specifically, the average size of ink drops fixed to the unit area of the inkjet receiving layer (0.1 cm$^2$) may be 50 μm or less, and specifically, the average size of the ink droplets adhered to the unit area (0.1 cm$^2$) of the ink-receiving layer may be 0.01 μm to 50 μm, 0.01 μm to 45 μm, 0.01 μm to 40 μm, 0.01 μm to 35 μm, 0.01 μm to 30 μm, 0.01 μm to 25 μm, 0.01 μm to 20 μm, 0.01 μm to 15 μm, 0.01 μm to 10 μm, 0.01 μm to 5 μm, 0.05 μm to 50 μm, 0.1 μm to 50 μm, 0.5 μm to 50 μm, 1 μm to 50 μm, 5 μm to 50 μm, 10 μm to 50 μm, 15 μm to 50 μm, 20 μm to 50 μm, 25 μm to 50 μm, 30 μm to 50 μm, 35 μm to 50 μm, 40 μm to 50 μm, 45 μm to 50 μm, 10 μm to 45 μm, 15 μm to 40 μm, 20 μm to 40 μm, 15 μm to 30 μm, 25 μm to 45 μm, 30 μm to 40 μm, 33 μm to 39 μm, 35 μm to 44 μm, 29 μm to 38 μm, or 35 μm to 38 μm.

Further, since the size of the ink droplet is constant, the standard deviation with respect to the droplet size may be 10 or less, specifically 0.01 to 10, 0.05 to 10, 1 to 10, 2 to 10, 0.01 to 8, 0.01 to 6, 0.5 to 8, 1 to 8, 2 to 8, 4 to 9, 3 to 7, 4 to 6 or 4.5 to 5.5.

In addition, the decorative material according to the present invention has excellent adhesion to the substrate layer, and when cross-cut evaluation according to JIS K 5600-5-6 is carried out, the area of the ink-receiving layer which is peeled or removed may be 20% or less of the entire area, specifically, the area of the inkjet layer, which is peeled or removed, may be 15% or less, 10%, 5%, 0.1 to 20%, 0.1 to 15%, 0.1 to 10%, 0.1 to 5% or 0.1 to 2% of the entire area, and in some cases, no peeling occurs at all and the damaged area may be close to 0%.

Meanwhile, the substrate layer provided in the decorative material according to the present invention is a layer serving as a base of the decorative material, supports the ink-receiving layer and the printed layer, and serves to absorb an impact transmitted from the outside. The substrate layer may have an average thickness in the range of 100 μm to 1,000 μm, and specifically 100 μm to 500 μm, 100 μm to 300 μm, or 150 μm to 250 μm.

Further, the substrate layer may include at least one selected from the group consisting of a polyvinyl chloride (PVC) substrate, a polyethylene terephthalate (PET) substrate and a glycol-modified polyethylene terephthalate (PETG) substrate.

In addition, the average thickness of the ink-receiving layer according to the present invention can be adjusted to an appropriate range that sufficiently receives the ink of the printed layer and does not affect the thickness of an entire decorative material. For example, the ink-receiving layer may have an average thickness of 10 μm or less, more specifically, 0.1 μm to 10 μm, 0.1 μm to 8 μm, 0.1 μm to 6 μm, 0.1 μm to 4 μm, 0.1 μm to 2 μm, 1 μm to 10 μm, 2 μm to 10 μm, 5 μm to 10 μm, 4 μm to 8 μm, 3 μm to 6 μm, 1 μm to 4 μm, 1 μm to 3 μm, 2 μm to 4 μm, 2.5 μm to 8 μm, 0.1 μm to 3.5 μm, or 1.5 μm to 3.5 μm so as not to be torn or lost due to external stimulus. As shown in FIG. 2, the average thickness of the ink-receiving layer referred to in the present invention may mean an average thickness ($T_{aver}$) of ink-receiving layer excluding the height of the dendrites, and in some cases, may mean a thickness including a ½ value of an average maximum height ($R_{max}$) of dendrites and an average wall thickness ($T_{aver}$) of the ink containing layer excluding a height of a dendrite.

In addition, the printed layer provided in the decorative material according to the present invention may be formed by imparting designs and/or patterns with various printing methods used in the art, and the ink used may include an aqueous ink containing water, etc. and/or a water soluble ink. The average thickness of the printed layer may be 0.1 μm to 1,000 μm, specifically, 0.1 μm to 500 μm, 0.1 μm to 200 μm, 0.1 μm to 100 μm, 0.1 μm to 50 μm, 0.1 μm to 10 μm, 0.1 μm to 5 μm, 0.1 μm to 1 μm, 0.1 μm to 0.5 μm, 1 μm to 5 μm, 5 μm to 20 μm, 20 μm to 50 μm, 40 μm to 60 μm, 50 μm to 100 μm, 200 μm to 400 μm, 150 μm to 300 μm, or 0.1 μm to 0.2 μm.

Furthermore, the decorative material according to the present invention may further comprise a transparent layer on the printed layer. The transparent layer may be formed on the top in order to improve surface quality such as scratch resistance and abrasion resistance of the decorative material and to improve stain resistance. The average thickness of the transparent layer may be 0.5 mm to 5 mm. When the thickness of the transparent layer is less than 0.5 mm, improvements in scratch resistance, abrasion resistance, and stain resistance of the decorative material may not be achieved. When the thickness of the transparent layer is more than 5 mm, the appearance of a pattern to be represented by the printed layer may be reduced by reflection or refraction of visible light by the transparent layer. The transparent layer may be formed from a composition comprising at least one selected from the group consisting of polyethylene terephthalate (PET) film, polybutylene terephthalate (PBT) film; polycarbonate film; ethylene vinyl acetate (EVA) film: polyethylene film; polypropylene film; polymethylmethacrylate (PMMA); and combinations thereof.

Method of Manufacturing Decorative Material

The present invention also provides, in one embodiment, a method of manufacturing a decorative material, comprising the steps of:

irradiating an acrylic resin composition applied on a substrate layer with ultraviolet rays to form an ink-receiving layer having a dendritic shape in which one point on a surface is set as a center and which has a radially sloping structure extending from the center to a periphery; and forming a printed layer with ink on the formed ink-receiving layer.

The method of manufacturing a decorative material according to the present invention comprises the steps of applying an acrylic resin composition onto a substrate layer, irradiating the applied acrylic resin composition with UV to form an ink-receiving layer, and then forming a printed layer with ink on the formed ink-receiving layer.

Here, the step of forming the ink-receiving layer is carried out by irradiation with UV, and specifically, may be carried out by curing the acrylic resin composition stepwise under different conditions, including a first light irradiation step of irradiating the acryl resin composition applied on the substrate layer with light having a wavelength of 200 nm or less under an inert gas condition to activate the composition; and a second light irradiation stage of irradiating the activated composition with light having a wavelength from 200 nm to 400 nm under an air condition to cure the composition to form the ink-receiving layer.

At this time, the first light irradiation step is a first step of irradiating the acrylic resin composition applied on the substrate layer with light, in which an excimer generated by the irradiated light shrinks the surface of the applied composition and/or the ink-receiving layer to form wrinkles, thereby increasing the scattering rate of light incident on the surface. The present invention makes it possible to shrink the surface of the acrylic resin composition and/or the ink-receiving layer to the above-described radial fine sloping structure using an excimer. To this end, the first light irradiation step may be carried out in a nitrogen ($N_2$) atmosphere containing a small amount of oxygen ($O_2$) using light having a high energy and a wavelength of less than 300 nm, specifically 100 to 200 nm or 150 to 195 nm. Specifically, the concentration of oxygen ($O_2$) contained in the nitrogen ($N_2$) atmosphere in the first light irradiation step may be 10 to 3,500 ppm, specifically, 10 to 3,000 ppm, 10 to 2,500 ppm, 1,000 to 2,000 ppm, 2,000 to 3,000 ppm, 3,000 to 3,500 ppm, 1,500 to 3,000 ppm, 10 to 2,000 ppm, 10 to 1,000 ppm, 10 to 500 ppm, 100 to 300 ppm, 10 to 200 ppm, 50 to 150 ppm, 80 to 120 ppm, 700 to 2,500 ppm, 900 to 1,500 ppm, 100 to 1,300 ppm, or 800 to 1,200 ppm.

Further, the distance between the composition and the light source in the first light irradiation step may be 5 to 100 mm, specifically, 5~80 mm, 5~60 mm, 5~40 mm, 10~70 mm, 10~50 mm, 10~30 mm, 20~80 mm, 20~60 mm, 20~50 mm, 20~30 mm, 25~75 mm, 50~80 mm, 40~60 mm or 45~55 mm.

Further, the light irradiation amount in the first light irradiation step may be 1 $mJ/cm^2$ to 150 $mJ/cm^2$, specifically, 1 $mJ/cm^2$ to 130 $mJ/cm^2$, 1 $mJ/cm^2$ to 110 $mJ/cm^2$, 1 $mJ/cm^2$ to 80 $mJ/cm^2$, 1 $mJ/cm^2$ to 60 $mJ/cm^2$, 1 $mJ/cm^2$ to 40 $mJ/cm^2$, 1 $mJ/cm^2$ to 35 $mJ/cm^2$, 1 $mJ/cm^2$ to 30 $mJ/cm^2$, 1 $mJ/cm^2$ to 20 $mJ/cm^2$, 1 $mJ/cm^2$ to 10 $mJ/cm^2$, 5 $mJ/cm^2$ to 10 $mJ/cm^2$, 5 $mJ/cm^2$ to 15 $mJ/cm^2$, 5 $mJ/cm^2$ to 20 $mJ/cm^2$, 5 $mJ/cm^2$ to 25 $mJ/cm^2$, 5 $mJ/cm^2$ to 35 $mJ/cm^2$, 5 $mJ/cm^2$ to 50 $mJ/cm^2$, 15 $mJ/cm^2$ to 25 $mJ/cm^2$, 25 $mJ/cm^2$ to 35 $mJ/cm^2$, 25 $mJ/cm^2$ to 50 $mJ/cm^2$, 40 $mJ/cm^2$ to 60 $mJ/cm^2$, 35 $mJ/cm^2$ to 85 $mJ/cm^2$, 45 $mJ/cm^2$ to 75 $mJ/cm^2$, 60 $mJ/cm^2$ to 70 $mJ/cm^2$, 70 $mJ/cm^2$ to 100 $mJ/cm^2$, 80 $mJ/cm^2$ to 150 $mJ/cm^2$, 100 $mJ/cm^2$ to 150 $mJ/cm^2$, 90 $mJ/cm^2$ to 120 $mJ/cm^2$, 110 $mJ/cm^2$ to 130 $mJ/cm^2$, or 61 $mJ/cm^2$ to 72 $mJ/cm^2$.

As an example, the first light irradiation step may be carried out by irradiating the composition with light having a wavelength of 172±2 nm under a nitrogen (N2) condition containing 100 ppm of oxygen ($O_2$) for a very short time of 1-2 seconds at a light amount of 62 to 68 $mJ/cm^2$ to form an excimer in the acrylic resin composition.

In the present invention, by controlling the gas conditions, the distance between the acrylic resin composition and the light source, and the irradiation amount in the first light irradiation step within the above-described ranges, the average diameter, height, and/or frequency of the random-radial fine sloping structure formed on the surface of the ink-receiving layer may be easily controlled.

Further, the second light irradiation step is a step of curing by applying ultraviolet (UV) energy to the composition and/or the ink-receiving layer whose surface is shrunk, and may be carried out by irradiating light having a wavelength of 200 to 400 nm, specifically 250 to 380 nm, 280 to 380 mm, 250 to 350 nm or 280 to 320 nm under an air condition. The present invention may not only improve the curing rate of the acrylic resin composition and/or the ink-receiving layer by using light having a wavelength of 200 to 400 nm under an air condition in the second light irradiation step but also induce the effect of cleaning the surface of the ink-receiving layer through ozone ($O_3$) conversion of molecular oxygen ($O_2$). Here, the surface temperature of the cured composition and/or the ink-receiving layer may be 20 to 90° C., specifically 20 to 80° C. or 30 to 70° C.

As an example, the second light irradiation step may be carried out by irradiating the composition and/or the ink-receiving layer with light having a wavelength of 300±5 nm under an air condition at a light amount of 20 to 800 $mJ/cm^2$ for a very short time of 1 to 2 seconds, wherein the distance between the acrylic resin composition and/or the ink-receiving layer and the light source may be 0.5 to 10 mm.

The light irradiated in the present invention can be irradiated according to a known method capable of irradiating light of a required wavelength at each step. For example, light having a wavelength of 400 nm or less, which is a UV region, may be irradiated using a mercury or metal halide lamp or the like.

Further, in the present invention, the time for which light is irradiated may be a very short time of 1 to 2 seconds, and this light irradiation time may be controlled by the speed at which the acrylic resin composition moves during light irradiation, such as the speed of movement of the acryl resin composition applied on the substrate. For example, the moving speed of the acrylic resin composition and/or the substrate coated with the composition may be 1 to 50 m/min, specifically, 5 to 40 m/min, 10 to 40 m/min, 20 to 40 m/min, 30 to 40 m/min, 15 to 25 m/min, 5 to 15 m/min, 15 to 20 m/min, 35 to 40 m/min or 18 to 22 m/min.

Since the method of manufacturing a decorative material according to the present invention can form the ink-receiving layer by irradiating the acrylic resin composition applied on the substrate layer with UV as described above, when the ink-receiving layer is formed through conventional thermal drying and/or thermal curing, it is possible not only to prevent the occurrence of curling according to the heat shrinkage rate of the substrate layer, but also to form an ink-receiving layer directly on the substrate layer, which has the advantage that the process can be simplified.

As an example, the decorative material produced through the method of manufacturing a decorative material according to the present invention can exhibit curling of 1 T or less under a temperature condition of 22±2° C. in a structural stability evaluation, and specifically can cause curling of 0.9 T or below, 0.9 T, 0.8 T, 0.7 T, 0.6 T, 0.5 T, etc. or less, and in some cases, can exhibit curling of 0 T without the occurrence of curling at all.

In addition, since the ink-receiving layer is formed through UV irradiation, a hydrophilic functional group such as a hydroxyl group (OH group) is substituted on the surface and surface energy is increased, so that the fixing force to the water soluble ink and/or the aqueous ink can be enhanced when the printed layer is to be formed with the water soluble ink and/or the aqueous inks.

By way of example, when a hydrophilic functional group is substituted and an average static water contact angle is measured, the average static water contact angle of the ink-receiving layer according to the present invention may be 5° to 60°, specifically, 5° to 55°, 5° to 50°, 5° to 45°, 5° to 40°, 5° to 35°, 5° to 30°, 5° to 25°, 5° to 20°, 5° to 15°, 5° to 10°, 10° to 60°, 20° to 60°, 30° to 60°, 35° to 60°, 45° to 60°, 50° to 60°, 15° to 45°, 20° to 40°, 25° to 55°, 35° to 55°, 30° to 50°, 40° to 50°, 37° to 47°, 42° to 54°, or 42° to 48°.

As another example, the ink-receiving layer may have an average size of ink droplets fixed to a unit area (0.1 cm$^2$) of 50 μm or less and a standard deviation with respect to a droplet size of 10 or less when the surface is observed by an optical microscope after printing with a water soluble ink and/or an aqueous ink.

The acrylic resin composition may contain a urethane acrylic oligomer, an acrylic monomer having a hydrophilic functional group, a polyfunctional acrylic monomer, and an initiator.

Specifically, the urethane acrylic oligomer means an oligomer containing an acrylic group as a polymerizable functional group together with a urethane group, and has an advantage that a radical polymerization reaction due to an initiation reaction of a photoinitiator occurs rapidly, a coating film excellent in elasticity and toughness is manufactured, and adhesion to a substrate layer composed of polyvinyl chloride (PVC) or the like is excellent. Such a urethane acrylate is synthesized from a polyisocyanate, a polyol, and an acrylate compound having a hydroxy group, and as the polyisocyanate, 5-isocyanate-1-(isocyanatemethyl)-1,3,3-trimethylcyclohexane, 4,4-dicyclohexylmethane diisocyanate, 1,6-diisocyanatehexane, and 1,6-diisocyanate hexane derivatives can be used, as the polyol, polyester polyol, polyether polyol, polycarbonate polyol, etc. can be used, and 2-hydroxyethyl acrylate, 2-hydroxypropyl acrylate, etc. can be utilized as the acrylate compound with the hydroxy group. In addition, the urethane acrylate may be a polyfunctional oligomer containing two or more polymerizable functional groups, and specifically may contain one or more of a bifunctional oligomer, a trifunctional oligomer, and a tetrafunctional oligomer.

The weight average molecular weight of the urethane acrylic oligomer may be 100 to 10,000, more specifically 500 to 5,000, 1,000 to 3,000, or 1,500 to 2,000. The durability of the decorative material can be further improved by adjusting the weight average molecular weight of the urethane acrylic oligomer to the above range.

In addition, the acrylic monomer having a hydrophilic functional group may be an acrylic monomer containing a hydroxyl group (—OH group), a carboxyl group (—COOH group), an amine group (—NH$_2$ group), or the like as a hydrophilic functional group. Specifically, the acrylic monomer having a hydrophilic functional group may include one or more selected from the group consisting of 2-hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxyethylene glycol (meth)acrylate or hydroxypropylene glycol (meth)acrylate, acrylic acid, methacrylic acid, (meth)acryloyloxyacetic acid, (meth)acryloyloxypropyl acid, (meth)acryloyloxybutyl acid, acrylic acid duplex, itaconic acid, maleic acid and caprolactone modified hydroxyl acrylate (CHA). For example, the acrylic monomer having a hydrophilic functional group may include hydroxyethyl methacrylate and hydroxypropyl acrylate.

In addition, the acrylic resin composition contains an acrylic monomer having a hydrophilic functional group in an amount of 30 to 90 parts by weight, specifically, 30 to 80 parts by weight, 30 to 70 parts by weight, 30 to 60 parts by weight, 30 to 50 parts by weight, 30 to 40 parts by weight, 45 to 90 parts by weight, 50 to 90 parts by weight, 60 to 90 parts by weight, 70 to 90 parts by weight, 80 to 90 parts by weight, 45 to 80 parts by weight, 50 to 75 parts by weight, 65 to 90 parts by weight, 60 to 80 parts by weight, 67 to 83 parts by weight, 59 to 73 parts by weight, or 68 to 72 parts by weight, based on 100 parts by weight of the urethane acryl oligomer.

As an example, when the acrylic monomer having a hydrophilic functional group contains hydroxyethyl(meth)acrylate and hydroxypropylacrylate, the acrylic monomers may be contained in an amount of 30 parts by weight and 40 parts by weight, respectively, based on 100 parts by weight of the urethane acrylic oligomer.

In addition, the polyfunctional acrylic monomer is a monomer containing two or more polymerizable functional groups, and examples of such polyfunctional acrylic monomers include one or more selected from the group consisting of 1,6-hexanediol diacrylate, tetraethylene glycol diacrylate, tripropylene glycol diacrylate, triethylene glycol diacrylate, dipropylene glycol diacrylate, pentaerythritol triacrylate, trimethylolpropaneethoxy triacrylate and trimethylpropane triacrylate. For example, the acrylic resin composition according to the present invention may contain tetraethylene glycol diacrylate, tripropylene glycol diacrylate and trimethylolpropane triacrylate as polyfunctional acrylic monomers.

In addition, the acrylic resin composition may contain a polyfunctional acrylic monomer in an amount of 50 to 150 parts by weight, specifically, 50 to 140 parts by weight, 50 to 130 parts by weight, 50 to 120 parts by weight, 50 to 110 parts by weight, 50 to 100 parts by weight, 50 to 90 parts by weight, 50 to 80 parts by weight, 75 to 150 parts by weight, 90 to 150 parts by weight, 100 to 150 parts by weight, 120 to 150 parts by weight, 130 to 150 parts by weight, 75 to 95 parts by weight, 90 to 105 parts by weight, 105 to 120 parts by weight, 115 to 130 parts by weight, 120 to 140 parts by weight, 135 to 150 parts by weight, 70 to 110 parts by weight, 85 to 120 parts by weight, 80 to 100 parts by weight, 90 to 100 parts by weight, 92 to 98 parts by weight, 81 to 98 parts by weight, or 92 to 109 parts by weight, based on 100 parts by weight of the acrylic oligomer.

As an example, when the acrylic monomer having a polyfunctional acrylic functional group contains tetraethylene glycol diacrylate, tripropylene glycol diacrylate and trimethylolpropane triacrylate as the polyfunctional acrylic monomer, it may be contained in an amount of 40 parts by weight, 40 parts by weight and 10 parts by weight, respectively, based on 100 parts by weight of the urethane acrylic oligomer.

Furthermore, the acrylic resin composition according to the present invention may further contain a filler having high hardness so as to serve as a seed of a dendrite shape formed on the surface of the ink-receiving layer and improve the durability of the decorative material. For example, as the filler, those capable of improving surface hardness without affecting the fixation of ink droplets and/or the adhesion to the substrate layer after curing of the acrylic resin composition can be used. Specifically, colloidal silica, alumina, glass beads, organic beads (polymer particles, etc.) and the like may be used as the filler, and the average particle size thereof may be 1 μm to 10 μm, or 3 to 7 μm.

The filler may be contained in an amount of 15 parts by weight or less, based on 100 parts by weight of the composition so as not to inhibit printability of the ink-receiving layer and adhesion to the substrate layer. For example, the filler may be included in an amount of 12 parts by weight or less, based on 100 parts by weight of the composition, more specifically, the content of the filler may have an upper limit of 12 parts by weight or less, 11 parts by weight or less, 10 parts by weight or less, 8 parts by weight or less, 6 parts by weight or less or 5 parts by weight or less, and the lower limit may be 0.01 parts by weight or more, 0.05 parts by weight or more, 0.1 parts by weight or more, 0.5 parts by weight or more, or 1 parts by weight or more. For example, the filler may be included in an amount of 0.1 to 15 parts by weight, 0.1 to 14 parts by weight, 0.1 to 13 parts by weight, 0.1 to 12 parts by weight, 0.5 to 11 parts by weight, 1 to 5 parts by weight, 3 to 7 parts by weight, 5 to 12 parts by weight, 7 to 14 parts by weight, 3 parts by weight to 11 parts by weight, 6 to 12 parts by weight, 9 to 14 parts by weight, 8 to 12 parts by weight, or 9 to 11 parts by weight.

In the present invention, by controlling the average particle size and content of the filler within the above range, it is possible to prevent viscosity from increasing due to excessive filler in the acrylic resin composition and workability from decreasing. In addition, it is possible to prevent the occurrence of cracks in the ink-receiving layer, and to increase the adhesion between the ink-receiving layer and another layer to improve durability.

In addition, the acrylic resin composition used in the present invention may contain no solvent, and even when a solvent is contained, the viscosity of the composition may be low, so that workability in forming the ink-receiving layer may be excellent. Specifically, the viscosity of the acrylic resin composition may be a low viscosity of 500 cps or less, specifically, 400 cps or less, 300 cps or less, 250 cps or less, 200 cps or less, 100 to 500 cps, 100 to 400 cps, 100 to 300 cps, 100 to 250 cps, 100 to 400 cps, 150 to 350 cps, 200 to 350 cps, 250 to 350 cps or 280 to 300 cps at 25° C., and it is possible to exhibit a low viscosity of 500 cps or less even when some fillers are included in order to improve the durability of the ink receiving layer. The acrylic resin composition according to the present invention has a low viscosity of 500 cps or less, which facilitates workability without mixing a solvent, and thus has an advantage of being environmentally friendly.

In addition, the method of applying the acrylic resin composition onto the substrate can be carried out by a method known in the art, for example, using a Mayer bar, a D-bar, a rubber roll, a G/V roll, an air knife, a slot die, or the like.

Further, in the method of manufacturing a decorative material according to the present invention, the step of forming the printed layer is a step of printing a printed layer on the ink-receiving layer using a water soluble ink and/or an aqueous ink commonly used in the art, and may be carried out by inkjet printing, gravure printing, screen printing, offset printing, rotary printing, flexographic printing, or a printing method combining them.

At this time, the printing step can be carried out at a printing speed of 50 m/min to 150 m/minute since high-speed single pass printing, which is a printing process applied to a smart factory, is possible because the ink fixing force of the ink-receiving layer is excellent. Specifically, the printing step can be carried out at a printing speed of 50 m/min to 140 m/min, 50 m/min to 120 m/min, 50 m/min to 110 m/min, 50 m/min to 100 m/min, 50 m/min to 80 m/min, 50 m/min to 60 m/min, 70 m/min to 150 m/min, 90 m/min to 150 m/min, 110 m/min to 150 m/min, 130 m/min to 150 m/min, 70 m/min to 130 m/min, 90 m/min to 110 m/min, 80 m/min to 100 m/min, 110 m/min to 140 m/min, 90 m/min to 130 m/min, 65 m/min to 85 m/min, or 95 m/min to 125 m/min.

In addition, the method of manufacturing a decorative material according to the present invention may further include a step of forming a transparent layer on the printed layer after the step for forming the printed layer. The transparent layer can improve the surface quality of the decorative material, such as scratch resistance and abrasion resistance, and can impart an effect of improving stain resistance to the decorative material. The transparent layer may be formed on the printed layer by, but is not limited to, thermal lamination carried out in a temperature range of 100 to 200° C.

MODE FOR CARRYING OUT THE INVENTION

Hereinafter, the present invention will be described in more detail with reference to Examples and Experimental Examples.

However, the following Examples and Experimental Example are merely illustrative of the present invention, and the content of this invention is not limited to the following Examples and Experimental Examples.

Example 1

100 parts by weight of a urethane methacrylate-based oligomer (molecular weight: 2,200), 30 parts by weight of hydroxypropylene acrylate, 30 parts of hydroxyethylene acrylate, 40 parts by weight of tripropylglycol diacrylate, 40 parts by weight of tetraethylglycol diacrylate and 10 parts by weight of trimethylpropane triacrylate were mixed, and 7 parts by weight of Irgacure-184 (IRG-184) as a photoinitiator was added. Then, 10 parts by weight of silica having an average size of 5±0.5 μm was mixed to obtain an acrylic resin composition.

A calendered white sheet composed of polyvinyl chloride (PVC) and having an average thickness of 0.2 mm was prepared as a substrate layer, and the acrylic resin composition prepared above was applied to the upper portion of the sheet to a thickness of 3 μm. Then, under a nitrogen ($N_2$) gas atmosphere containing 1,000 ppm of oxygen ($O_2$) gas, the composition was irradiated with light of 172±0.5 nm at a distance of 50±1 cm from the composition at a light amount of 65±1 mJ/cm² (first light irradiation). Then, under an air condition, the composition subjected to the first light irradiation was irradiated with light of 300±1 nm at a distance of 100±1 cm from the composition at a light amount of 1,200 mJ/cm² (second irradiation) to form an ink-receiving layer having an average thickness of 3 μm. A decorative material was manufactured by forming a printed layer (average thickness: 1 μm) on the ink-receiving layer by an inkjet printing method using four kinds of water soluble inks exhibiting black, red, blue, yellow and green.

Example 2

A decorative material was manufactured in the same manner as in Example 1 except that a polyethylene terephthalate film (average thickness: 30 μm) was thermally laminated on the printed layer at 150±2° C. to form a transparent layer.

Comparative Example 1

A printed layer was formed on general printing paper by inkjet printing using a water soluble ink.

Comparative Example 2

A decorative material was manufactured by preparing a calendared white sheet composed of polyvinyl chloride (PVC) and having an average thickness of 0.2 mm as a substrate layer, and forming a printed layer on the prepared substrate layer by inkjet printing using a water soluble ink.

Comparative Example 3

A calendered white sheet composed of polyvinyl chloride (PVC) and having an average thickness of 0.2 mm was prepared as a substrate layer, and the acrylic resin composition prepared in Example 1 was applied to the upper portion of the sheet to a thickness of 3 μm. Then, under an air condition, the applied acrylic resin composition was irradiated with light of 300±1 nm at a distance of 100±1 cm from the composition at a light amount of 1,200 mJ/cm² to form an ink-receiving layer having an average thickness of 3 μm. A decorative material was manufactured by forming a printed layer (average thickness: 1 μm) on the ink-receiving layer by inkjet printing using a water soluble ink.

Comparative Example 4

A decorative material was manufactured in the same manner as in Example 1 except that the composition was irradiated with light (first light irradiation) at a distance of 50±1 cm from the composition at a light amount of 45±1 mJ/cm² under a nitrogen ($N_2$) gas atmosphere containing 4,000 ppm of oxygen ($O_2$) gas upon irradiation with the first light.

Experimental Example 1

A scanning electron microscope (SEM) analysis was carried out on the decorative materials prepared in Example 1 and Comparative Examples 3 and 4 to confirm the surface structure of the ink-receiving layer of the decorative material according to the present invention, and the results are shown in FIGS. 2 to 4.

Referring to FIGS. 2 and 3, it can be seen that the decorative material of Example 1 according to the present invention has a radially sloping structure with a certain size and frequency on the surface and the structure has a height decreasing from the center to the periphery. Further, when the decorative material of Example 1 was examined, it was found that the average size of the radially sloping structure was 50±2 μm, the height of the center was 4±1 μm and 140 to 165 dendrite shapes per unit area (1 mm×1 mm) were included.

In comparison, it was found that the ink-receiving layer of the decorative material of Comparative Example 3 which was not subjected to the first light irradiation step did not have a fine sloping structure on the surface. Further, referring to FIG. 4, it was confirmed that although the first light irradiation step was carried out, the concentration of the oxygen ($O_2$) gas in the nitrogen ($N_2$) gas at the time of the first irradiation was significantly high, since the decorative material of Comparative Example 4 with a low light amount includes a sloping structure on the surface but had a irregular dendrite size, the ink was accumulated between the fine sloping structures, and thus the ink was spread.

From these results, it can be seen that the first light irradiation step of irradiating light having a wavelength of less than 200 nm generates excimers, and the generated excimers generate short-wavelength UV to rapidly promote surface hardening of the composition and/or the ink-receiving layer, whereby shrinkage occurs on the surface of the composition and/or the ink-receiving layer to form a dendritic shaped fine sloping structure. In addition, it can be seen that the shape and frequency of the fine sloping structure can be controlled by adjusting the conditions for carrying out the first light irradiation step, particularly the gas conditions, to specific conditions.

Experimental Example 2

The following experiments were carried out on the decorative materials prepared in Examples 1 and 2 and Comparative Examples 1 to 4 in order to evaluate printability, print clarity, adhesion to the substrate layer and the degree of bending of the decorative material according to the present invention, and the results are shown in Table 1 and FIGS. 5 and 6 below.

1) Surface Roughness Evaluation

A specimen was prepared by forming each ink-receiving layer on a white sheet composed of polyvinyl chloride (PVC) as in Examples 1 and 2 and Comparative Examples 2 to 4, and the general printed paper of Comparative Example 1 was separately prepared, and then the surface roughness (Rz) according to the ISO 4287 standard was measured for each of the specimens with the ink-receiving layer formed thereon and the normal printed paper.

2) Evaluation of Print Clarity

The decorative material was placed in a bright place under a fluorescent lamp at 30 cm in front of the eyes of the evaluator, and the clarity of printed patterns was visually evaluated. At this time, the evaluation criteria are as follows:

◯: The area where the ink is not fixed or the area of the margin is 5% or less relative to the total area (100%) of the printed pattern;

Δ: The area where the ink is not fixed or the area of the margin is more than 5% and 20% or less relative to the total area (100%) of the printed pattern;

X: The area where the ink is not fixed or the area of the margin is greater than 20% relative to the total area (100%) of the printed pattern.

3) Evaluation of Printability

The decorative material surface was observed with an optical microscope to measure the size of ink droplets present in a unit area (0.1 cm$^2$), and the average value and standard deviation of the measured sizes were derived.

4) Static Water Contact Angle Assessment

Static water contact angle (static WCA) was measured using a contact angle meter (model name: SmartDrop, manufactured by Femtofab Co. Ltd). At this time, each measurement was carried out by dropping a drop of 10 µl of distilled water on the surface, and repeated three times to derive an average value thereof.

5) Evaluation of Adhesion to the Substrate Layer

In accordance with JIS K 5600-5-6, six lines were cross-cut in the horizontal and vertical directions, respectively, and after a prescribed tape (JIS Z 1522) was attached to the surface, one side of the tape was strongly pulled off at an angle of 90°, and the surface after the detachment was visually confirmed to evaluate the adhesion to the substrate layer. The evaluation criteria are as follows:

TABLE 1

| | Surface roughness (Rz) | Print clarity | Average size of droplet | Standard deviation | Water contact angle | Adhesion |
|---|---|---|---|---|---|---|
| Ex. 1 | 3.7 ± 0.1 µm | ○ | 36.4 ± 0.1 µm | 5.2 | 45 ± 0.5° | ○ |
| Ex. 2 | 3.6 ± 0.1 µm | ○ | 34.4 ± 0.1 µm | 4.7 | 43 ± 0.5° | ○ |
| Comp. Ex. 1 | 3.4 ± 0.1 µm | ○ | 97.9 ± 0.1 µm | 15.3 | 60 ± 0.5° | ○ |
| Comp. Ex. 2 | 1.3 ± 0.1 µm | X | 86.1 ± 0.1 µm | 41.2 | 77 ± 0.5° | X |
| Comp. Ex. 3 | 1.4 ± 0.1 µm | Δ | 69.5 ± 0.1 µm | 40.2 | 102 ± 0.5° | Δ |
| Comp. Ex. 4 | 3.2 ± 0.1 µm | Δ | 60.2 ± 0.1 µm | 21.1 | 60 ± 0.5° | ○ |

○: The area damaged by peeling or partial detachment with respect to the entire cross-cut area (100%) is less than 5%;
Δ: The area damaged by peeling or partial detachment with respect to the entire cross-cut area (100%) is 5% or more and less than 15%;
X: The area damaged by peeling or partial detachment with respect to the entire cross-cut area (100%) is 15% or more.

As shown in Table 1 and FIGS. 5 and 6, it can be seen that the decorative material according to the present invention has an ink-receiving layer having a dendritic shaped fine sloping structure on the surface thereof between a substrate layer and a printed layer, and is excellent in printability and clarity, and excellent in adhesion to the substrate layer.

Specifically, with reference to Table 1, it was found that the decorative materials of Examples 1 and 2 having an ink-receiving layer having a dendritic shaped fine sloping structure on the surface thereof had an average surface roughness (Rz) of 3 to 8 µm and a static water contact angle of 40 to 50°. This means that when the ink-receiving layer is formed, by irradiating light having different wavelength conditions in a stepwise manner, a dendritic fine sloping structure is induced on the surface of the ink-receiving layer to achieve a specific range of surface roughness while increasing surface energy and substituting a hydrophilic functional group to lower the static water contact angle.

In addition, the decorative materials of Examples 1 and 2 had an average droplet size of 32 to 38 µm and a standard deviation of 4 to 6, whereas the decorative material of Comparative Examples 1 to 4 showed that the ink droplets did not bleed or were not uniformly distributed, and had a standard difference of 10 or more and an average drop size of 50 µm, and thus the print clarity difference clearly appeared as shown in FIG. 6.

From these results, it can be seen that when the composition is cured by irradiating a specific range of short-wavelength light stepwise under different conditions, the average size of the dendritic shaped radially sloping structure formed on the surface of the ink-receiving layer, the height of the center, the frequency per unit area, and the like are controlled to adjust physical properties of the decorative material, such as print clarity, adhesion to the substrate layer and the like.

DESCRIPTION OF SYMBOLS

Light irradiation chamber
111: First light irradiator (UV irradiator)
112: Second light irradiator (UV irradiator)
120: Irradiated light
130 Conveyor belt
140: Gas diaphragm
150: Specimen
200: Sectional structure of decorative material before formation of printed layer
210: Ink-receiving layer
220: Substrate layer
211: Dendrite

INDUSTRIAL APPLICABILITY

The decorative material according to the present invention has an ink-receiving layer having a radially fine sloping structure having a dendritic shape, so that the absorbing and/or fixing property, i.e., the printability, of the ink printed on the ink-receiving layer is improved, is excellent in clarity, and aesthetic effects are excellent, and therefore can be useful as a decorative material.

The invention claimed is:

1. A decorative material comprising a substrate layer, an ink-receiving layer, and a printed layer;
   wherein the ink-receiving layer comprises an ink-receiving layer of an acrylic resin composition having a dendritic shape, which is a radially sloping structure extending from a center to a periphery with a point on the surface as the center; and
   an average size of ink droplets present in a unit area of 0.1 cm$^2$ when observing the surface with an optical microscope is 50 µm or less.

2. The decorative material of claim 1, wherein the radially sloping structure is present in a number of 20 to 400 in a unit area of 1 mm×1 mm of the surface.

3. The decorative material according to claim 1, wherein the average diameter of the radially sloping structure is 5 µm to 500 µm.

4. The decorative material according to claim 1, wherein the surface roughness (Rz) of the ink-receiving layer is 0.5 µm to 10 µm on average.

5. The decorative material according to claim 1, wherein the ink-receiving layer has an average static water contact angle of 5° to 60°.

6. The decorative material according to claim 1, further comprising a transparent layer on the printed layer.

7. A method of manufacturing a decorative material, comprising the steps of:

irradiating an acrylic resin composition applied on a substrate layer with ultraviolet rays to form an ink-receiving layer having a dendritic shape in which one point on a surface is set as a center and which has a radially sloping structure extending from the center to a periphery; and forming a printed layer with ink on the formed ink-receiving layer, wherein the step of forming the printed layer is carried out at a printing speed of 50 to 150 m/min.

8. The method according to claim 7, wherein the light irradiation step comprises:

a first light irradiation step of irradiating the acrylic resin composition applied on the substrate layer with light having a wavelength of 200 nm or less under an inert gas condition to activate the composition; and a second light irradiation step of irradiating the activated composition with light of a wavelength between 200 nm and 400 nm under an air condition to cure the composition to form the ink-receiving layer.

9. The method according to claim 8, wherein the first light irradiation step is carried out at a light irradiation amount of 1 mJ/cm$^2$ to 150 mJ/cm$^2$.

10. The method according to claim 8, wherein the first light irradiation step is carried out under a nitrogen ($N_2$) condition in which the concentration of oxygen ($O_2$) is 10 ppm to 3,500 ppm.

11. The method according to claim 7, wherein the acrylic resin composition comprises:

100 parts by weight of a urethane (meth)acrylic oligomer;

30 to 90 parts of an acrylic monomer having a hydrophilic functional group; and 50 to 150 parts of a polyfunctional acrylic monomer.

12. The method according to claim 8, wherein the acrylic resin composition further contains at least one filler selected from the group consisting of silica, alumina, glass beads, and organic beads.

13. The method according to claim 12, wherein the content of the filler is 15 parts by weight or less, based on 100 parts of the acrylic resin composition.

14. The method according to claim 7, wherein the acrylic resin composition has a viscosity of 500 cps or less.

15. The method according to claim 7, further comprising a step of forming a transparent layer on the printed layer after the step of forming the printed layer.

* * * * *